(12) United States Patent
Burke et al.

(10) Patent No.: US 10,084,666 B2
(45) Date of Patent: Sep. 25, 2018

(54) INSTRUMENTATION AND MONITORING OF SERVICE LEVEL AGREEMENT (SLA) AND SERVICE POLICY ENFORCEMENT

(71) Applicant: International Business Machines Corporation, Armonk, NY (US)

(72) Inventors: Thomas C. Burke, Durham, NC (US); Mario E. De Armas, Wellington, FL (US); Oswaldo Gago, Margate, FL (US); Srinivasan Muralidharan, Apex, NC (US); Gaurang Shah, Cary, NC (US); Maria E. Smith, Davie, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 15/147,760

(22) Filed: May 5, 2016

(65) Prior Publication Data

US 2016/0248639 A1    Aug. 25, 2016

Related U.S. Application Data

(63) Continuation of application No. 13/764,895, filed on Feb. 12, 2013, now Pat. No. 9,363,289.

(51) Int. Cl.
*H04L 12/24* (2006.01)
*H04L 29/06* (2006.01)

(52) U.S. Cl.
CPC ...... *H04L 41/5019* (2013.01); *H04L 41/5029* (2013.01); *H04L 41/5032* (2013.01); *H04L 63/20* (2013.01)

(58) Field of Classification Search
CPC ..................................................... H04L 12/24
(Continued)

(56) References Cited

U.S. PATENT DOCUMENTS 6,728,748 B1    4/2004   Mangipudi et al.
6,925,493 B1    8/2005   Barkan et al.
(Continued)

FOREIGN PATENT DOCUMENTS

EP    2099162 A1    9/2009
WO    2010080367 A2    7/2010
WO    2010149826 A1    12/2010

OTHER PUBLICATIONS

United States Patent and Trademark Office, Office Action for U.S. Appl. No. 13/764,847, dated Mar. 27, 2017, pp. 1-48, Alexandria, VA, USA.
(Continued)

*Primary Examiner* — Vivek Srivastava
*Assistant Examiner* — Sibte Bukhari
(74) *Attorney, Agent, or Firm* — Lee Law, PLLC; Christopher B. Lee

(57) ABSTRACT

Source policy identification information of a registry service policy is captured. The source policy identification information includes a source policy identifier (ID), a source policy name, and a source policy uniform resource locator (URL). The captured source policy identification information is correlated with configured policy enforcement processing rules and processing actions using a source policy reference key. Per-transaction service policy enforcement information that documents policy enforcement activities performed by a policy enforcement point (PEP) is captured. The captured per-transaction service policy enforcement information is correlated with the captured source policy identification information using the source policy reference key.

17 Claims, 6 Drawing Sheets

(58) Field of Classification Search
USPC .......................................................... 709/203
See application file for complete search history.

(56) References Cited

U.S. PATENT DOCUMENTS

| | | | |
|---|---|---|---|
| 7,009,963 | B1 | 3/2006 | Schulz |
| 7,243,157 | B2 | 7/2007 | Levin et al. |
| 7,272,115 | B2 | 9/2007 | Maher, III et al. |
| 7,730,138 | B2 | 6/2010 | Ballinger et al. |
| 7,734,784 | B1 | 6/2010 | Araujo et al. |
| 7,962,633 | B1 | 6/2011 | Sidebottom et al. |
| 7,987,253 | B2 | 7/2011 | Pfitzmann |
| 8,010,678 | B2 | 8/2011 | Araujo et al. |
| 8,099,488 | B2 | 1/2012 | Laye et al. |
| 8,131,831 | B1 | 3/2012 | Hu |
| 8,141,125 | B2 | 3/2012 | Maes |
| 8,146,096 | B2 | 3/2012 | Angelov et al. |
| 9,213,574 | B2 | 12/2015 | Faruquie et al. |
| 9,450,836 | B2 | 9/2016 | Hammer et al. |
| 2002/0049841 | A1 | 4/2002 | Johnson et al. |
| 2002/0065864 | A1 | 5/2002 | Hartsell et al. |
| 2003/0088529 | A1* | 5/2003 | Klinker ............... H04L 45/00 706/3 |
| 2004/0103339 | A1 | 5/2004 | Chalasani et al. |
| 2004/0167979 | A1 | 8/2004 | Aikens et al. |
| 2005/0080914 | A1 | 4/2005 | Lerner et al. |
| 2005/0177545 | A1 | 8/2005 | Buco et al. |
| 2006/0036447 | A1 | 2/2006 | Roever et al. |
| 2006/0041636 | A1 | 2/2006 | Ballinger et al. |
| 2006/0143686 | A1 | 6/2006 | Maes |
| 2006/0233180 | A1 | 10/2006 | Serghi et al. |
| 2007/0006278 | A1 | 1/2007 | Ioan Avram et al. |
| 2007/0124820 | A1* | 5/2007 | Burch ................. G06F 21/31 726/26 |
| 2007/0150936 | A1 | 6/2007 | Maes |
| 2007/0186281 | A1 | 8/2007 | McAlister |
| 2007/0192500 | A1 | 8/2007 | Lum |
| 2007/0200671 | A1 | 8/2007 | Kelley et al. |
| 2008/0046335 | A1 | 2/2008 | Zhou |
| 2008/0049648 | A1* | 2/2008 | Liu .................... H04L 65/1016 370/310 |
| 2008/0127208 | A1 | 5/2008 | Bedi et al. |
| 2008/0209047 | A1 | 8/2008 | Beigi et al. |
| 2009/0006527 | A1 | 1/2009 | Gingell, Jr. et al. |
| 2009/0132543 | A1 | 5/2009 | Chatley et al. |
| 2009/0219940 | A1 | 9/2009 | Jansson |
| 2009/0225763 | A1 | 9/2009 | Forsberg et al. |
| 2009/0264097 | A1 | 10/2009 | Cai et al. |
| 2009/0306999 | A1 | 12/2009 | Srinivasan et al. |
| 2010/0043050 | A1 | 2/2010 | Nadalin et al. |
| 2010/0049968 | A1 | 2/2010 | Dimitrakos et al. |
| 2010/0125477 | A1 | 5/2010 | Mousseau et al. |
| 2010/0125844 | A1 | 5/2010 | Mousseau et al. |
| 2010/0146037 | A1 | 6/2010 | Little |
| 2010/0205293 | A1 | 8/2010 | Hu et al. |
| 2010/0278119 | A1 | 11/2010 | Potkonjak |
| 2010/0287599 | A1 | 11/2010 | He et al. |
| 2011/0010751 | A1 | 1/2011 | Soulhi |
| 2011/0047274 | A1 | 2/2011 | Kuo et al. |
| 2011/0131307 | A1 | 6/2011 | El Bazzal |
| 2011/0271321 | A1 | 11/2011 | Soppera et al. |
| 2011/0282907 | A1 | 11/2011 | Ramsey et al. |
| 2011/0283224 | A1 | 11/2011 | Ramsey et al. |
| 2012/0011517 | A1 | 1/2012 | Smith et al. |
| 2012/0023063 | A1 | 1/2012 | Fenton |
| 2012/0131091 | A1 | 5/2012 | Yamuna et al. |
| 2012/0131135 | A1 | 5/2012 | Yamuna et al. |
| 2012/0158931 | A1 | 6/2012 | Ohlman et al. |
| 2012/0210003 | A1 | 8/2012 | Castro et al. |
| 2012/0216046 | A1 | 8/2012 | McDougal et al. |
| 2013/0019018 | A1 | 1/2013 | Rice |
| 2014/0082366 | A1 | 3/2014 | Engler et al. |
| 2014/0094159 | A1* | 4/2014 | Raleigh ................ H04W 24/02 455/418 |
| 2015/0304231 | A1 | 10/2015 | Gupte et al. |

OTHER PUBLICATIONS

Anne Anderson, et al., OASIS: XACML profile for Web-services, Specification, Sep. 29, 2003, pp. 1-41, OASIS Open, USA.

United States Patent and Trademark Office, Office Action for U.S. Appl. No. 13/764,864, dated Mar. 23, 2017, pp. 1-35, Alexandria, VA, USA.

Florian Rosenberg, et al., Integrating Quality of Service Aspects in Top-Down Business Process Development using WS-CDL and WS-BPEL, Proceedings of the 11th IEEE International Enterprise Distributed Object Computing Conference (EDOC) 2007, pp. 1-12, IEEE Computer Society, Washington, DC, USA.

Adrian Paschke, RBSLA: A declarative Rule-based Service Level Agreement Language based on RuleML, International Conference on Intelligent Agents, 2005, pp. 1-7, Web Technology and Internet Commerce, Vienna, Austria.

Dimitar Angelov, et al. (W3C Web Services Policy Working Group), Web Services Policy 1.5—Attachment, W3C Specification, Sep. 4, 2007, pp. 1-49, World Wide Web Consortium W3C, Published online at: http://www.w3.org/TR/ws-policy-attach#CalculatingEffectivyPolicywithWSDL1.1.

Elionildo Da Silva Menezes, et al., A Policy Management Framework Using Traffic Engineering in DiffServ Networks, Lecture Notes of the Quality of Service in Multiservice IP Networks International Workshop, LNCS vol. 1989, Jan. 24-26, 2001, pp. 331-345 (plus two citation pages added), Springer-Verlag, Berlin/Heidelberg, Germany.

Martha Young, Policy-Based Network Management: Finally?, Journal: Business Communications Review, Aug. 2002, pp. 48-51 (plus one citation page added), vol. 32, No. 8, BCR Enterprises, USA.

Claudio Agostino Ardagna, et al., Web Service Architecture for Enforcing Access Control Policies, Preliminary Version for later publication in Journal: Electronic Notes in Theoretical Computer Science, 2004, pp. 1-15, Elsevier B. V., The Netherlands.

Author Unknown, Oracle® Fusion Middleware, Security and Administrator's Guide for Web Services, 11g Release (11.1.1.6), Nov. 2011, pp. 1-738, Oracle Corporation, USA.

Anne H. Anderson, Domain-Independent, Composable Web Services Policy Assertions, Proceedings of the Seventh IEEE International Workshop on Policies for Distributed Systems and Networks, Jun. 5-7, 2006, pp. 1-4 (plus one citation page added), IEEE Computer Society, Washington, DC, USA.

United States Patent and Trademark Office, Office Action for U.S. Appl. No. 13/764,828, dated Dec. 9, 2014, pp. 1-37, Alexandria, VA, USA.

United States Patent and Trademark Office, Office Action for U.S. Appl. No. 13/764,828, dated May 21, 2015, pp. 1-35, Alexandria, VA, USA.

United States Patent and Trademark Office, Notice of Allowance for U.S. Appl. No. 13/764,828, dated Sep. 25, 2015, pp. 1-11, Alexandria, VA, USA.

United States Patent and Trademark Office, Office Action for U.S. Appl. No. 14/224,456, dated Dec. 10, 2014, pp. 1-26, Alexandria, VA, USA.

United States Patent and Trademark Office, Office Action for U.S. Appl. No. 14/224,456, dated May 21, 2015, pp. 1-23, Alexandria, VA, USA.

United States Patent and Trademark Office, Notice of Allowance for U.S. Appl. No. 14/224,456, dated Oct. 27, 2015, pp. 1-15, Alexandria, VA, USA.

United States Patent and Trademark Office, Office Action for U.S. Appl. No. 13/764,847, dated Jan. 5, 2015, pp. 1-32, Alexandria, VA, USA.

United States Patent and Trademark Office, Office Action for U.S. Appl. No. 13/764,847, dated Dec. 4, 2015, pp. 1-49, Alexandria, VA, USA.

United States Patent and Trademark Office, Office Action for U.S. Appl. No. 13/764,864, dated Jan. 5, 2015, pp. 1-29, Alexandria, VA, USA.

United States Patent and Trademark Office, Office Action for U.S. Appl. No. 13/764,864, dated Jul. 30, 2015, pp. 1-34, Alexandria, VA, USA.

(56) References Cited

OTHER PUBLICATIONS

United States Patent and Trademark Office, Advisory Action for U.S. Appl. No. 13/764,864, dated Dec. 17, 2015, pp. 1-8, Alexandria, VA, USA.
United States Patent and Trademark Office, Office Action for U.S. Appl. No. 13/764,895, dated May 20, 2015, pp. 1-26, Alexandria, VA, USA.
United States Patent and Trademark Office, Office Action for U.S. Appl. No. 13/764,895, dated Nov. 19, 2015, pp. 1-24, Alexandria, VA, USA.
United States Patent and Trademark Office, Notice of Allowance for U.S. Appl. No. 13/764,895, dated Mar. 10, 2016, pp. 1-21, Alexandria, VA, USA.
United States Patent and Trademark Office, Office Action for U.S. Appl. No. 13/764,847, dated Oct. 5, 2017, pp. 1-44, Alexandria, VA, USA.
United States Patent and Trademark Office, Office Action for U.S. Appl. No. 13/764,864, dated Oct. 18, 2017, pp. 1-34, Alexandria, VA, USA.
United States Patent and Trademark Office, Advisory Action for U.S. Appl. No. 13/764,847, dated Dec. 27, 2017, pp. 1-11, Alexandria, VA, USA.
United States Patent and Trademark Office, Office Action for U.S. Appl. No. 14/989,268, dated Jan. 5, 2018, pp. 1-45, Alexandria, VA, USA.

\* cited by examiner

US 10,084,666 B2

INSTRUMENTATION AND MONITORING OF SERVICE LEVEL AGREEMENT (SLA) AND SERVICE POLICY ENFORCEMENT

BACKGROUND

The present invention relates to service level agreement (SLA) policy enforcement. More particularly, the present invention relates to instrumentation and monitoring of service level agreement (SLA) and service policy enforcement.

Service level agreements (SLAs) are contracts for services formed between consumers and service providers. For example, a consumer may enter into a service level agreement with a service provider to send and/or receive an agreed number of messages (e.g., text messages) per month for a contracted/set fee. The SLA may further specify that, if the consumer exceeds the agreed number of messages per month associated with the contracted/set fee, an additional per message fee will be charged for each additional message.

SUMMARY

A method includes: capturing, via a processor, source policy identification information of a registry service policy that comprises a source policy identifier (ID), a source policy name, and a source policy uniform resource locator (URL); correlating the captured source policy identification information with configured policy enforcement processing rules and processing actions using a source policy reference key; capturing per-transaction service policy enforcement information that documents policy enforcement activities performed by a policy enforcement point (PEP); and correlating the captured per-transaction service policy enforcement information with the captured source policy identification information using the source policy reference key.

A system includes a memory and a processor programmed to: capture source policy identification information of a registry service policy that comprises a source policy identifier (ID), a source policy name, and a source policy uniform resource locator (URL); correlate the captured source policy identification information with configured policy enforcement processing rules and processing actions within the memory using a source policy reference key; capture per-transaction service policy enforcement information that documents policy enforcement activities performed by a policy enforcement point (PEP); and correlate the captured per-transaction service policy enforcement information with the captured source policy identification information within the memory using the source policy reference key.

A computer program product includes a computer readable storage medium having computer readable program code embodied therewith, where the computer readable program code when executed on a computer causes the computer to: capture source policy identification information of a registry service policy that comprises a source policy identifier (ID), a source policy name, and a source policy uniform resource locator (URL); correlate the captured source policy identification information with configured policy enforcement processing rules and processing actions using a source policy reference key; capture per-transaction service policy enforcement information that documents policy enforcement activities performed by a policy enforcement point (PEP); and correlate the captured per-transaction service policy enforcement information with the captured source policy identification information using the source policy reference key.

DETAILED DESCRIPTION

Figure 1:
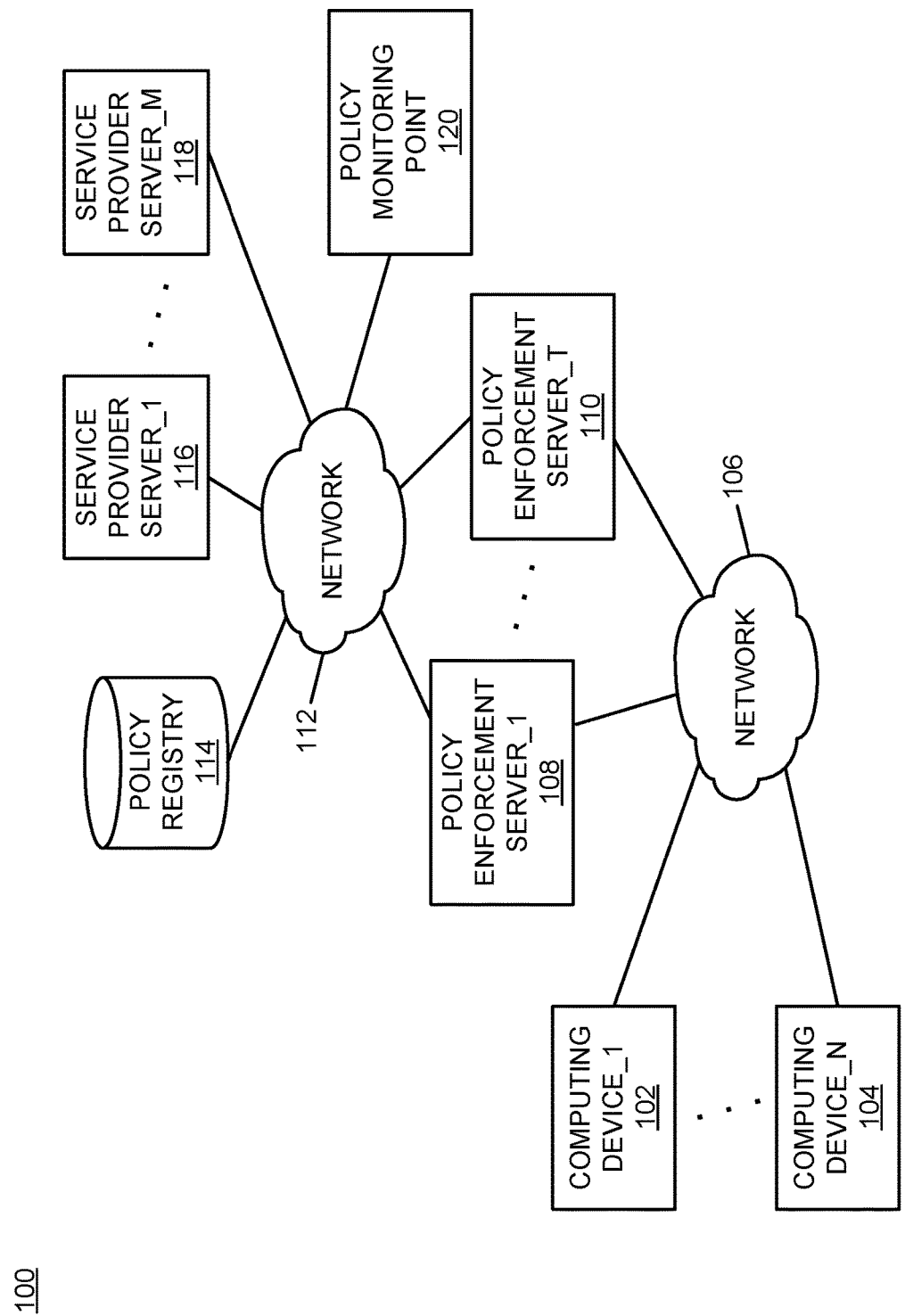
FIG. 1 is a block diagram of an example of an implementation of a system for instrumentation and monitoring of service level agreement (SLA) and service policy enforcement according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for instrumentation and monitoring of service level agreement (SLA) and service policy enforcement. The policy enforcement described herein may be performed, for example, by devices such as a policy enforcement point (PEP) that provides proxy policy enforcement for service providers and consumers. The present technology provides an approach for capturing source policy assertion metadata (e.g., policy identifiers (ID), policy names, and policy URL references), for generating configuration instrumentation to associate the captured source policy assertion metadata with policy enforcement configuration artifacts (e.g., processing rules and actions), and for processing transaction records using the captured policy monitoring information.

The present technology implements/utilizes an abstract syntax tree (AST) to store compiled service definition files and policy documents. Further, the AST data model is extended to capture source policy document information on a per-assertion consumed basis. As such, the granularity of source policy information may be captured at an assertion level to enhance information correlation. The captured source policy assertion metadata (alternatively referred to herein as "source policy metadata") provides correlation between policy enforcement and source policy information, which as described above may be performed at the assertion level.

One or more proxy policy table keys (reference keys) may be created that refer back to and associate the information gathered for instrumentation with an original registry policy. Because each processing action may be considered an atomic artifact, analysis of enforcement actions that occur in association with the same policy may be assigned the same policy reference key for all performed processing actions. As such, a policy enforcement administration and monitoring module may determine the source policy from which the respective processing actions originated, and correlate these processing actions with the policy assertions from the original registry policy using the proxy policy table keys. Accordingly, by capturing source policy information in association with artifacts/processing actions, instrumentation and monitoring of policy enforcement may be improved to correlate the processing actions with the original registry/source policies that are enforced by proxy by one or more PEPs.

The extended metadata that is captured to correlate processing actions with source policies may include a source policy identifier (ID), a source policy name, and a source policy uniform resource locator (URL). The AST processing described herein retains and manages source policy assertion metadata during policy normalization and service level agreement (SLA) bindings. Shared source policy tables may be populated with the AST source policy metadata and a reference key may be generated that is used with policy enforcement configuration artifacts for instrumentation and monitoring of the enforcement processing actions that are performed.

AST data may be evaluated in association with the generation of "assertion configuration artifacts" (e.g., processing rules and actions, alternatively called "policy enforcement configuration artifacts") to instrument those assertion configuration artifacts with references to an original registry/source policy from which they have been created. Transaction traffic through gateways may be monitored to capture processing rules and processing actions that are performed, and to extract original source policy references associated with the respective performed assertion configuration artifacts. A policy enforcement correlation data model (alternatively, a "monitoring data model") may be created to represent the policy enforcement processing rules and processing actions that are performed, and may be populated to include the source policy metadata. As such, the policy enforcement configuration data model allows policy monitoring points (PMPs) to reconcile specific policy enforcement processing rules and processing actions to the respective original source policy document(s).

Based upon the instrumentation and monitoring of service level agreement (SLA) and service policy enforcement described herein, source policy metadata may be retained within PEP configuration artifact representations. As such, source policy metadata may be referenced to provide a scalable solution for monitoring policy enforcement activity.

Further, PEP policy enforcement rules and actions may be reconciled with the original source policy metadata details. A policy enforcement correlation data model may be annotated with policy enforcement detail that includes correlated source policy information usable by PMPs to monitor and evaluate policy enforcement actions.

The present technology leverages automated policy transformation and runtime enforcement that allows policies within a policy domain (e.g., service provider policy domain, etc.) to be associated with any runtime object (e.g., objects representing specific consumers, organizations, service resources, etc.) that needs to be controlled or regulated by that policy. Those policies may be enforced against the runtime object(s) at policy enforcement points (PEPs) that operate to provide proxy service offerings including policy enforcement. Examples of runtime objects against which policies may be enforced include transactions, web requests, database requests, representational state transfer (REST) services, and web applications. The control or regulation of the runtime object by a policy may be further determined based upon the content of that object at runtime, such as user credentials. Policies may be attached at an object level for an object, thereby enhancing the specificity of policy enforcement based upon the granularity of the respective objects (e.g., at the level of specific consumers, organizations, service resources, etc.) and based upon the content of those objects at runtime.

The present technology may be applied, for example, to implement service level agreements (SLAs) within a service oriented architecture (SOA) network appliance engine. The present technology may be implemented, for example, using higher-level gateway platform actions rather than low-level code. As such, implementation may be performed at a layer of abstraction above the encoding level for the respective appliance engines. It should be noted that the present technology may be implemented with a variety of policy constructs and is not limited to particular variations of how policies are constructed. Accordingly, the present technology may be flexibly applied across a variety of service platforms.

It should be noted that conception of the present subject matter resulted from recognition of certain limitations associated with analysis of SLA and service policy enforcement within runtime environments. For example, it was observed that SLA policy enforcement capabilities may necessitate an ability to monitor the enforcement actions applied to transactions processed by a specific web services gateway. However, it was determined that there are many challenges in supporting policy enforcement action monitoring and existing systems/implementations lack sufficient capabilities to effectively monitor enforcement actions. It was determined that existing systems lack instrumentation to associate a policy's assertions with the original source policy's ID, policy name, and policy URL. Additionally, it was determined that existing systems lack an effective means of associating gathered policy source information with configuration artifacts (e.g., configuration object types) generated to implement policy assertions. It was further determined that existing systems lack capabilities for processing transaction records at a rate sufficiently high to support a high transaction rate of systems. As such, in view of the observations and determinations described above, the present subject matter improves policy administration and enforcement by providing technology for instrumentation and monitoring of service level agreement (SLA) and service policy enforcement, as described above and in more detail below.

Regarding instrumentation, the present technology may be used to retain URL information of externally referenced policies. The retained URLs may be used to accurately instrument assertions embedded inside original source policies with the policy information of the innermost policy that contained the identifier (ID) and name information, as well as the accurate URL that documents where the assertion was found. The present technology further provides a policy normalization process designed to ensure that the instrumented information is retained and properly propagated as an original source policy is transformed into a normalized form for enforcement and monitoring.

Regarding association of gathered policy source information with policy enforcement configuration artifacts generated to implement policy assertions, the present technology creates a proxy policy table and populates proxy policy table entries that may be referenced using a unique proxy policy table entry key. The proxy policy table entry key value of the unique proxy policy table entry key references a source policy table entry. Further, the proxy policy table entry key value may be embedded into policy enforcement configuration artifacts as a proxy policy reference key, as described above, so that the proxy policy table entry key value may be extracted and utilized during monitoring.

Additionally, configuration execution of generated policy enforcement processing actions may be monitored. During monitoring, results of the policy enforcement configuration executions may be logged along with the associated proxy policy table entry key value that references the source policy table entry to provide a closed information loop of the monitoring information back to the original source policy.

Regarding processing of the transaction records at a rate sufficiently high to support a high transaction rate of systems, the present technology addresses performance (e.g., processor usage and transaction throughput) implications for collecting and associating SLA and service policy enforcement metrics with each transaction. Additionally, memory use for collecting transaction records may be managed to provide efficient space utilization, along with network bandwidth management for transmission of SLA monitoring metrics with large numbers of transaction records to a monitoring agent. Performance implications at a monitoring agent's end for processing transaction records may also be considered and managed to further improve efficiency.

Several additional definitions may be utilized within the following description, and some are repeated and further defined below. The term "service policy" or "policy" as utilized herein represents any mediation enforcement provision, routing provision, security provision, or any other custom policy/provision that is written to a specification that a policy enforcement system may implement. As such, a service policy may be implemented as a web service (e.g., web services description language (WSDL)), as a representational state transfer (REST) implementation or service, as a web application (e.g., plain old XML (PDX)) implementation, as a database request, or otherwise as appropriate for the given implementation.

Regarding service policies, a service level agreement (SLA) is a service policy that represents an agreement (e.g., a contract for services) between a service provider and a consumer where a level of service is formally defined and agreed between the parties to the SLA. The SLA records a common understanding about services, priorities, responsibilities, guarantees, warranties, and any other particulars of the agreement. Examples of SLAs include business services such as a web service, a REST service, and a web application. The SLA may specify, for example, the levels of availability, serviceability, performance, operation, or other attributes of the service to be provided by the service provider to the consumer. As a further example, an SLA may represent a processing agreement such as a transaction rate, a processor utilization level, a disk utilization level, and a memory utilization level for the business service.

A service level definition (SLD) represents a service policy that protects the service provider infrastructure access and utilization constraints, such as for example from accesses by non-contracting entities for which an SLA has not been established, or to limit a maximum resource utilization to prevent service degradation (e.g., maximum number of messages per minute). An SLD, when attached to a policy subject, is enforced by a policy enforcement point (PEP). A "policy subject" represents an entity with which a policy (e.g., an SLA or SLD) may be associated, such as for example, with an endpoint of a transaction, a message, a resource, an operation or other entity.

A policy administration point (PAP) represents a location (e.g., repository, registry, etc.) where policies such as SLAs and SLDs may be created, stored, accessed, and modified. A WebSphere® service registry and repository (WSRR) represents one possible example of a PAP. A policy enforcement point (PEP) represents an intermediary system that operates to enforce defined policies. The PEP provides proxy service offerings including policy enforcement. A "policy framework" represents the infrastructure used to convert supported policy vocabularies into processing actions and processing rules.

A policy may be specified as an SLA between a service provider and a consumer. Each consumer may have its own selected service options. As such, for purposes of the present example, it is assumed that two consumers have selected different service plans for a particular service. Within this example, one consumer has selected a "default" service level defined within the service provider domain for this particular service offering at a level of one hundred (100) allowed requests per hour. Similarly, another consumer has selected a higher-tier service level, identified within the present example as a "gold" service level, with a service offering of five hundred (500) allowed requests per hour. As such, enforcement of this SLA by a PEP would involve identification of the respective consumers, correlation of the respective consumers with their selected service plans/levels, and monitoring of request rates (e.g., message rates, transaction rates, etc.) for each consumer based upon their respective selected plans. If a threshold number of requests per hour associated with a selected plan were reached, the PEP would then invoke processing to identify any additional service requests as overages relative to the plan or prevent the service requests, as appropriate for a given implementation. Similarly, if a consumer issues a request that is authorized based upon the selected service plan, the PEP is responsible for ensuring that the request is satisfied for the consumer by the service provider.

The present technology enhances policy enforcement functionality by providing technology for instrumentation and monitoring of service level agreement (SLA) and service policy enforcement. The instrumentation and monitoring of service level agreement (SLA) and service policy enforcement involves the capture and recordation of source references to original registry service policies during the creation/instrumentation of policy enforcement artifacts, and the monitoring of policy enforcement actions with correlation of the performed policy enforcement actions with the original registry service policies using the captured references. The policy enforcement rules and actions are dynamically implemented and enforced on a transactional basis during runtime as transactions associated with the defined policies occur (e.g., as messages are received), and as such, monitoring and correlation may also be performed during runtime as transactions occur.

Example transformations include transformation of a defined service policy into one or more processing actions in a normalized and interchangeable format. The normalized and interchangeable format may include, for example, a language such as extensible markup language (XML), XML stylesheet language for transformations (XSLT), object-oriented languages such as Java™ and C++ programming languages, relational database management (RDBM) languages such as structured query language (SQL), and scripting languages/implementations such as PHP: Hypertext Preprocessor (PHP) and Perl.

It should be noted that the PEP processing technology described herein operates as a proxy for both the service providers and the consumers to enforce the various provisions of defined SLAs and SLDs. As such, the PEP represents a proxy component/entity for both the service provider(s) and for the consumer(s). Within this proxy context for policy enforcement, the PEP operates to protect the interests of the service providers to ensure that no unauthorized consumers access the respective services provided by the service providers and to ensure that consumers that are authorized do not exceed the defined SLDs associated with the services and service providers. Similarly, the PEP operates to protect the interests of consumers and service providers to ensure that the SLA(s) for which the consumers and service providers have contracted are upheld/enforced. To fulfill this dual-proxy role, the PEP operates as a proxy intermediary for both of the respective entities to analyze messages communicated between the respective entities and to enforce policy enforcement rules that are defined in association with the PEP based upon policies associated with the respective services and agreements.

A policy framework, as described in more detail below, consumes policies for enforcement by a PEP, captures policy references to original service policies during instrumentation for policy enforcement, monitors policy enforcement activities, and correlates the policy enforcement activities with the original service policies using the captured policy references. To enforce the respective policies, the policy framework generates policy enforcement rules that include processing actions.

The technology for instrumentation and monitoring of service level agreement (SLA) and service policy enforcement described herein may be performed in real time to allow prompt analysis and correlation of SLA and service policy enforcement within a runtime environment with source service policies. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for instrumentation and monitoring of service level agreement (SLA) and service policy enforcement. A computing device_1 102 through a computing device_N 104 represent consumer client devices that utilize services specified by SLAs. The computing device_1 102 through the computing device_N 104 may communicate with one another and with other devices via a network 106. A policy enforcement server_1 108 through a policy enforcement server_T 110 represent policy enforcement points (PEPs), as described above. The policy enforcement server_1 108 through the policy enforcement server_T 110 communicate and interconnect via a network 112 with a policy registry 114 that stores policies (e.g., SLDs and SLAs) generated by one or more of a service provider server_1 116 through a service provider server_M 118. It should be noted that the network 106 and the network 112 are illustrated as separate networks for ease of description, and that any arrangement of interconnection may be utilized as appropriate for a given implementation.

The service provider server_1 116 through the service provider server_M 118 represent service capable devices (e.g., messaging devices for text messages, etc.). The service provider server_1 116 through the service provider server_M 118 also represent administrative devices that may be utilized by service provider administrators for policy creation, such as creation of SLDs and SLAs.

As described above, policies implemented by service provider administrators via devices, such as the service provider server_1 116 through the service provider server_M 118, may be stored within the policy registry 114 for enforcement by PEPs, such as the policy enforcement server_1 108 through the policy enforcement server_T 110. The policy enforcement server_1 108 through the policy enforcement server_T 110 each implement a policy framework as described above and in more detail below for transformation and enforcement of defined service policies stored in the policy registry 114 into policy enforcement rules that include processing rules and processing actions that are to be enforced during runtime against objects. The objects may be of varying granularity (e.g., at the level of specific consumers, organizations, service resources, etc., as described above) based upon the particular scope and configuration of the respective policies to be enforced for the respective service providers and consumers.

A PEP may be implemented via each of the policy enforcement server_1 108 through the policy enforcement server_T 110. The PEP has the role of enforcing policies defined outside or within the PEP. The PEPs operate as gateways that provide virtual services that proxy policy enforcement operations for the real backend services. The PEPs protect and optimize transactions flowing through the respective network(s) on behalf of the backend services. As such, the policy enforcement server_1 108 through the policy enforcement server_T 110 each represent proxy gateways that provide proxy services for the service providers represented by the service provider server_1 116 through the service provider server_M 118 and for consumers represented by the computing device_1 102 through the computing device_N 104. It should be noted that there may be a many-to-one relationship of PEPs to service providers. Each PEP may create its own policy enforcement rules based upon policies to be enforced for a given service provider.

A policy monitoring point (PMP) 120 provides policy instrumentation and monitoring capabilities within the system 100. The PMP 120 captures and records source policy references to original registry service policies stored within the policy registry 114 during the creation/instrumentation of policy enforcement artifacts (e.g., processing rules and processing actions). The PMP 120 also monitors policy enforcement actions and correlates the performed policy enforcement actions with the original registry service policies using the captured policy references. The PMP 120 collects transaction details from the PEPs implemented via the policy enforcement server_1 108 through the policy enforcement server_T 110 and uses the collected transaction details for data analysis, audit reports, and event alarms. It should be noted that while the PMP 120 is illustrated as a separate component for ease of description purposes, it may be implemented via one of the policy enforcement server_1 108 through the policy enforcement server_T 110 or the service provider server_1 116 through the service provider server_M 118 without departure from the scope of the present technology.

As will be described in more detail below in association with FIG. 2 through FIG. 5B, the PMP 120 provides technology for automated instrumentation and monitoring of service level agreement (SLA) and service policy enforcement. The automated instrumentation and monitoring of service level agreement (SLA) and service policy enforcement is based upon capture and correlation of original repository policy references with monitored policy enforcement rules and actions enforced during runtime to fulfill the respective SLDs and SLAs established for messaging management within the system 100. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a service provider messaging server, a web server, application server, or other data server device, or any other device capable of processing information as described above and in more detail below.

The network 106 and the network 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
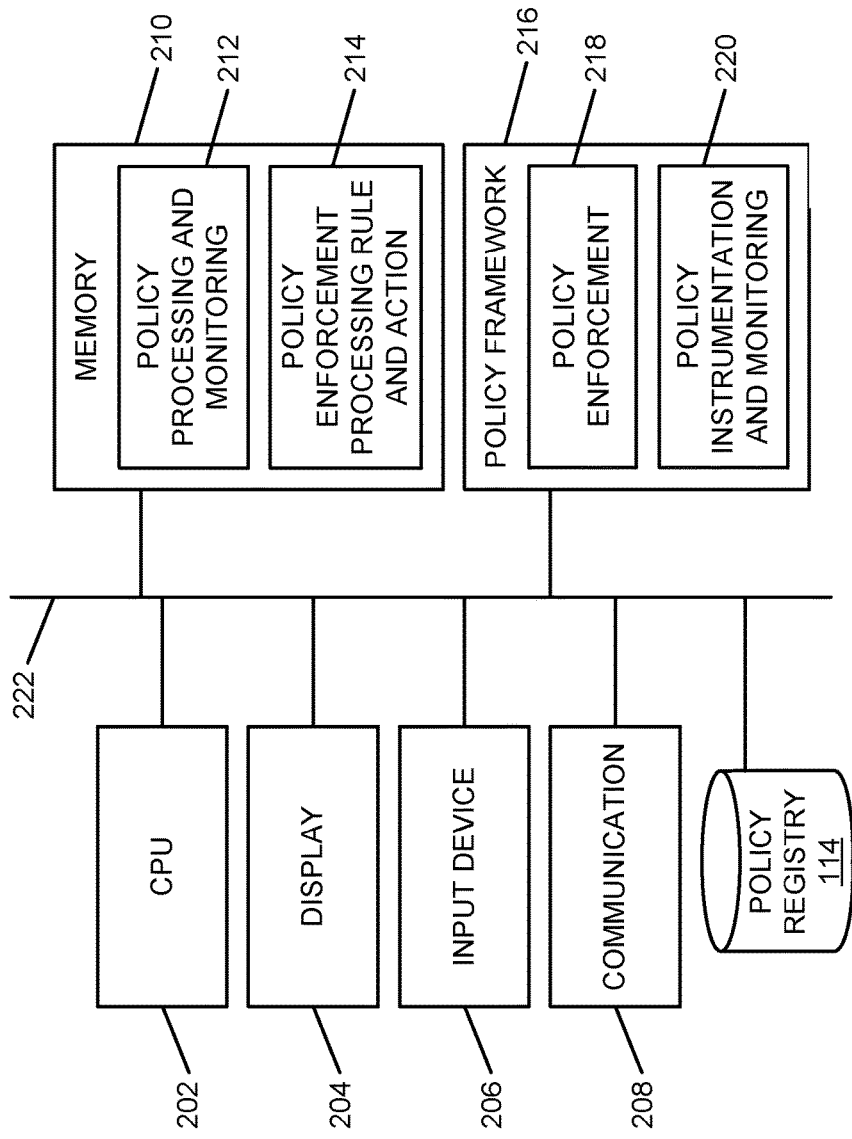
FIG. 2 is a block diagram of an example of an implementation of a core processing module capable of instrumentation and monitoring of service level agreement (SLA) and service policy enforcement according to an embodiment of the present subject matter.

FIG. 2 is a block diagram of an example of an implementation of a core processing module 200 capable of instrumentation and monitoring of service level agreement (SLA) and service policy enforcement. The core processing module 200 may be associated with the PMP 120 to implement the instrumentation and monitoring of service level agreement (SLA) and service policy enforcement. It should, however, be noted that components of the core processing module 200 may additionally or alternatively be associated with the computing device_1 102 through the computing device_N 104, the policy enforcement server_1 108 through the policy enforcement server_T 110, or with the service provider server_1 116 through the service provider server_M 118, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for instrumentation and monitoring of service level agreement (SLA) and service policy enforcement in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a policy processing and monitoring storage area 212 that provides memory space for the creation and storage of registry policy references, policy correlation data structures (e.g., references to SLAs and SLDs, and proxy policy tables, respectively), and policy enforcement monitoring information in association with the core processing module 200 when implemented, for example, in association with one or more of the PMP 120.

The memory 210 also includes a policy enforcement processing rule and action storage area 214 that provides storage space for created policy enforcement rules and associated runtime processing actions. As described above, the created policy enforcement rules and associated runtime processing actions may be utilized for runtime enforcement of defined policies (e.g., SLAs and SLDs) in association with the core processing module 200 when implemented, for example, in association with one or more of the policy enforcement server_1 108 through the policy enforcement server_T 110.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A policy framework module 216 is also illustrated. The policy framework module 216 provides processing capabilities for the core processing module 200, as described above and in more detail below. The policy framework module 216 implements the technology for instrumentation and monitoring of service level agreement (SLA) and service policy enforcement of the core processing module 200.

The policy framework module 216 includes policy enforcement module 218 that implements the policy enforcement, such as via one of the policy enforcement server_1 108 through the policy enforcement server_T 110. The policy framework module 216 also includes a policy instrumentation and monitoring module 220 that implements the instrumentation and monitoring of service level agreement (SLA) and service policy enforcement, as described above and in more detail below.

It should also be noted that the policy framework module 216 may form a portion of other circuitry described without departure from the scope of the present subject matter. Further, the policy framework module 216 may alternatively be implemented as an application stored within the memory 210. In such an implementation, the policy framework module 216 may include instructions executed by the CPU 202 for performing the functionality described herein. The CPU 202 may execute these instructions to provide the processing capabilities described above and in more detail below for the core processing module 200. The policy framework module 216 may form a portion of an interrupt service routine (ISR), a portion of an operating system, a portion of a browser application, or a portion of a separate application without departure from the scope of the present subject matter.

The policy registry 114 is also shown associated with the core processing module 200 within FIG. 2 to show that the policy registry 114 may be coupled to the core processing module 200 without requiring external connectivity, such as via the network 106 or the network 112.

The CPU 202, the display 204, the input device 206, the communication module 208, the memory 210, the policy framework module 216, and the policy registry 114 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the policy registry 114 is illustrated as a separate component for purposes of example, the information stored within the policy registry 114 may also/alternatively be stored within the memory 210 without departure from the scope of the present subject matter. Accordingly, the core processing module 200 may take many forms and may be associated with many platforms.

Figure 3:
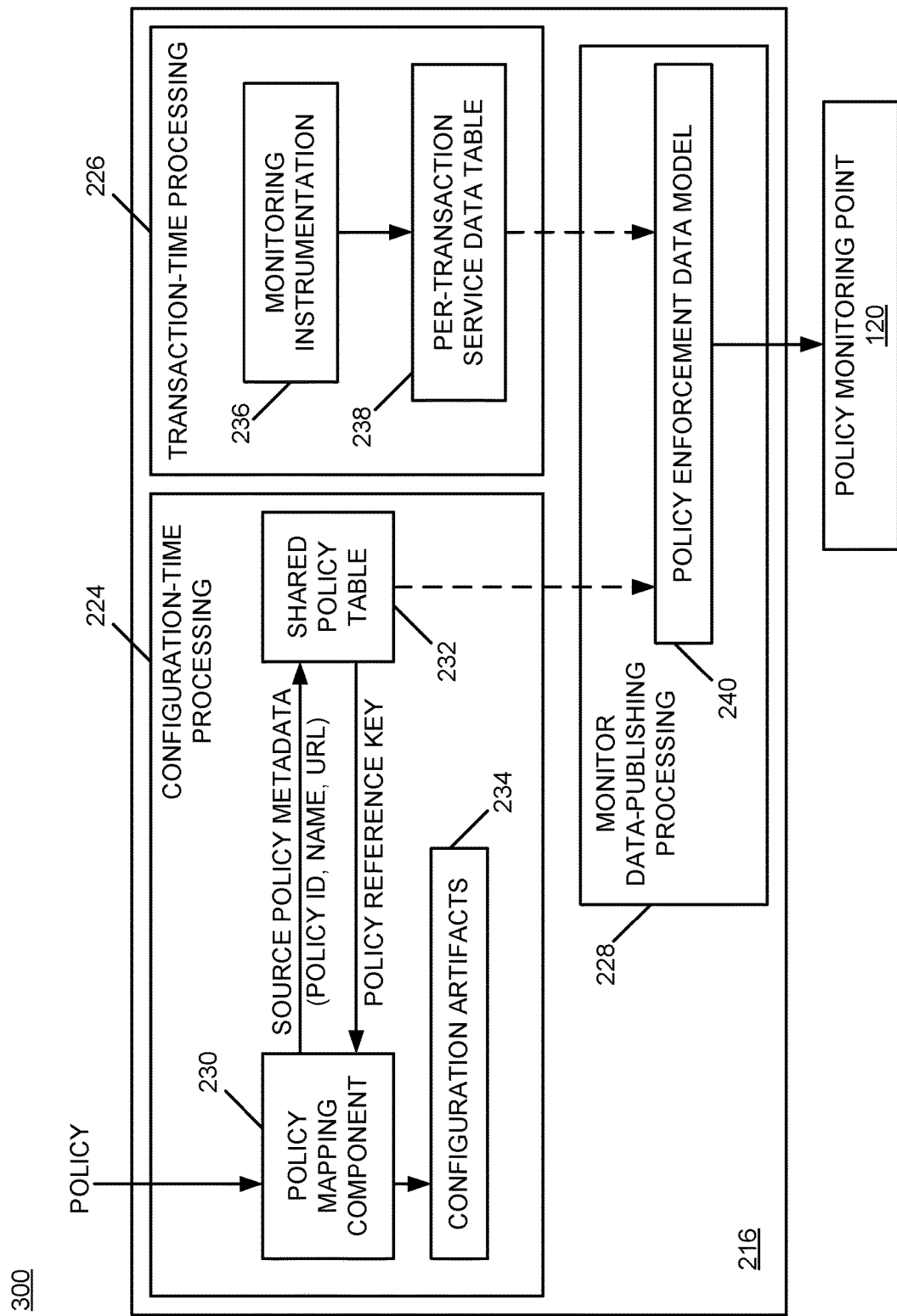
FIG. 3 is a diagram of an example of an implementation of a high-level processing flow for instrumentation and monitoring of service level agreement (SLA) and service policy enforcement by monitoring policy enforcement processing rules and actions that include source policy metadata according to an embodiment of the present subject matter.

FIG. 3 is a diagram of an example of an implementation of a high-level processing flow 300 for instrumentation and monitoring of service level agreement (SLA) and service policy enforcement by monitoring policy enforcement processing rules and actions that include source policy metadata. The policy framework module 216 is illustrated in more detail within FIG. 3. Additional sub-components are also illustrated as described below. These sub-components may form a portion of the policy enforcement module 218 and the policy instrumentation and monitoring module 220. However, to avoid crowding within the drawing, the policy enforcement module 218 and the policy instrumentation and monitoring module 220 are not separately illustrated.

A configuration-time processing module 224 provides configuration capabilities and a transaction-time processing module 226 provides policy enforcement and transactional data capture capabilities. A monitor data-publishing processing module 228 collects and publishes transactional details.

The configuration-time processing module 224 includes a policy mapping component 230 that receives an original source policy document, such as from the policy registry 114, performs web services description language (WSDL) compilation of the received policy, and performs policy mapping of the compiled policy. The policy mapping component 230 creates policy entry instances in a shared policy table 232. After the compilation process is completed, the policy mapping stylesheets may be invoked. These policy mapping stylesheets are responsible for parsing the effective policy and creating processing rules and processing actions.

During the configuration of enforcement rules (processing rules and processing actions), the PEP platform implements technology to instrument a reference key into configuration artifacts generated by the policy framework 216. The shared policy table key 232 is generated programmatically to uniquely reference the source policy entry using original source policy metadata, as described in more detail below. The manner in which this reference key is injected or stored into action objects in processing rules is based upon individual PEP platform implementation details, and may be performed as appropriate for a given implementation. For example, a custom string property may be used to store a policy table key that was provided by policy table management processing.

It should be noted that within a given time interval, a majority of the transaction records may include similar/common information with respect to captured metadata from a source policy document within mediation enforcement metrics (e.g., details about policy enforcement processing rules and actions). To consolidate policy metadata from a transaction record's mediation enforcement metrics, the present technology may leverage the shared policy table 232, in which source policy document metadata is referenced using the unique policy reference key.

The shared policy table 232 may be formatted, for example, as an optimized hash table. The shared policy table 232 may be implemented as a shared policy data model that includes source policy metadata of the source policy document (e.g., a policy ID, policy name, and policy source URL). The entries in the shared policy table 232 may be organized and accessed using a created policy reference key (e.g., proxy policy table keys) and a policy correlator identifier (ID). The policy reference key may be formatted as a unique hash key generated from the policy metadata and the policy correlator ID. For example, an SHA1 hash algorithm may be used to generate the unique hashed policy reference key. The policy mapping component 230 associates the policy reference key in the shared policy table 232 with configuration artifacts 234 that include policy enforcement processing rules and processing actions that are associated with the source policy for enforcement by the policy reference key.

Each policy entry instance in the shared policy table 232 may include several elements. A first element of a policy entry instance includes an entry identifier (ID) that references the identifier of the original source policy transformed for the respective policy enforcement action. A second element of a policy entry instance includes an entry name that references the name of the original source policy transformed for the respective policy enforcement action. A third element of a policy entry instance includes an entry URL that references the URL of the original source policy transformed for the respective policy enforcement action. A fourth element of a policy entry instance includes the policy reference key that specifies a unique hash key generated from the original source policy ID, policy name, and policy source URL. A fifth element of a policy entry instance includes a policy-correlator identifier (ID) that specifies the policy entry instance within the shared policy table 232 that refers to the policy configuration entry.

The transaction-time processing module 226 includes a monitoring instrumentation module 236 that operates during transaction processing to monitor policy enforcement activities. The monitoring instrumentation module 236 captures processing rules and enforcement actions, extracts the respective policy reference key associated with configuration artifacts used for enforcement, and saves/stores the policy reference key and mediation enforcement metrics/actions within a per-transaction service data table 238. The mediation enforcement metrics may include processing rules and processing actions performed by a PEP during policy enforcement. The mediation enforcement metrics are stored for each transaction within the per-transaction service data table 238 with the enforcement actions used for the respective transaction and the respective source policy reference. As such, on a per-transaction basis, source policy references that are enforced are documented for the respective transaction along with the individual policy enforcement actions that were performed to enforce the respective policies.

The monitor data-publishing processing module 228 creates a policy enforcement data model 240 that captures the per-transaction policy enforcement actions and the information from the shared policy table 232 (including the configuration artifacts). The policy enforcement data model 240 additionally documents the specific policy enforcement processing rules and processing actions performed, and correlates those policy enforcement processing rules and processing actions with the original source policy metadata from the shared policy table 232.

The following pseudo syntax illustrates one possible example of a portion of an entry in the shared policy table 232 based upon the original source policy metadata that may be extracted on a per-transaction basis.

```
<entry key = "f7e9a129ee49ffd0f18d" policy-correlator="11">
    <id />
    <name>RouteMessage-policy</name>
    <url>local:///ExecuteXSL-modify-policy.xml</url>
</entry>
```

As can be seen from the above pseudo syntax, the extracted data includes both a "key" (e.g., policy reference key) and a "policy-correlator" identifier. The policy enforcement action that has been performed is based upon an original source policy named "RouteMessage-policy." The URL for the original source policy is "local:///ExecuteXSL-modify-policy.xml."

The following pseudo syntax provides an example of a mediation-enforcement data entry that documents a mediation enforcement action within the per-transaction service data table 238.

```
<mediation-enforcement>
    <rule name="service__11__1__sla1-req" type="request">
        <actions>
            <action type="route-action"
                name="service__4__1__sla1__route"
                policy-key="f7e9a129ee49ffd0f18d"
                result="ok"/>
        </actions>
    </rule>
</mediation-enforcement>
```

The example mediation-enforcement data entry documents the name of the respective enforcement action and the type of action (e.g., a request in this example). The example mediation-enforcement data entry also documents the action taken, the policy name, the policy key, and the result of the enforcement action.

The monitor data-publishing processing module 228 collects the information from the shared policy table 232 and the per-transaction service data table 238 and correlates the information within the policy enforcement data model 240. As such, the monitor data-publishing processing module 228 provides monitoring and transaction enforcement tracing information that is correlated with the original registered source policy. The PMP 120 may collect the correlated transaction details from the PEPs implemented by one or more of the policy enforcement server_1 108 through the policy enforcement server_T 110, and may evaluate/analyze the correlated information as appropriate for a given implementation.

It should be noted that policy enforcement configuration artifacts may change over time with changes in policies from the policy registry 114 or from the local WSDL. As such, the content of the shared policy table 232 may change over time. To mitigate against the possibility of stale information being processed for monitoring purposes, the monitor data-publishing processing module 228 collects and publishes transactional details. The transactional details may include information stored within the shared policy table 232, information associated with each pull request, and mediation enforcement metrics/information with each transaction record to the PMP 120.

The PMP 120 processes collected transaction records to perform the monitoring of service level agreement (SLA) and service policy enforcement. The PMP 120 uses the policy reference key from the mediation enforcement metrics to correlate the source policy metadata in the shared policy table 232 for data analysis and audit reporting. As such, the present technology automates policy enforcement tracking and enforcement management within a PEP policy enforcement platform.

It should be noted that the respective tables described and illustrated within FIG. 3 may be stored within the policy processing and monitoring storage area 212. Alternatively, the respective tables may be stored within a separate memory within the policy framework 216, or within the respective sub-components. As such, the storage location of the respective tables may be selected and implemented as appropriate for a given implementation.

Figure 4:
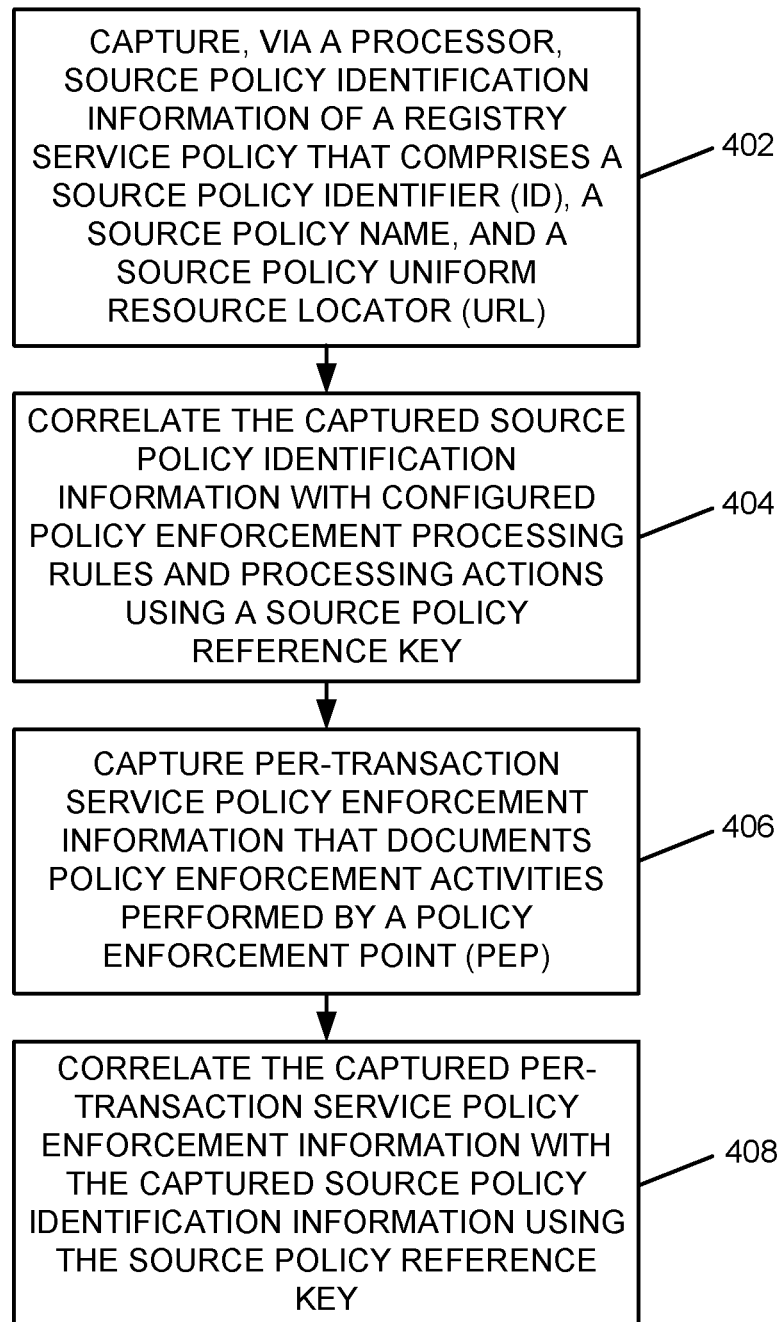
FIG. 4 is a flow chart of an example of an implementation of a process for instrumentation and monitoring of service level agreement (SLA) and service policy enforcement according to an embodiment of the present subject matter.
Figure 5A:
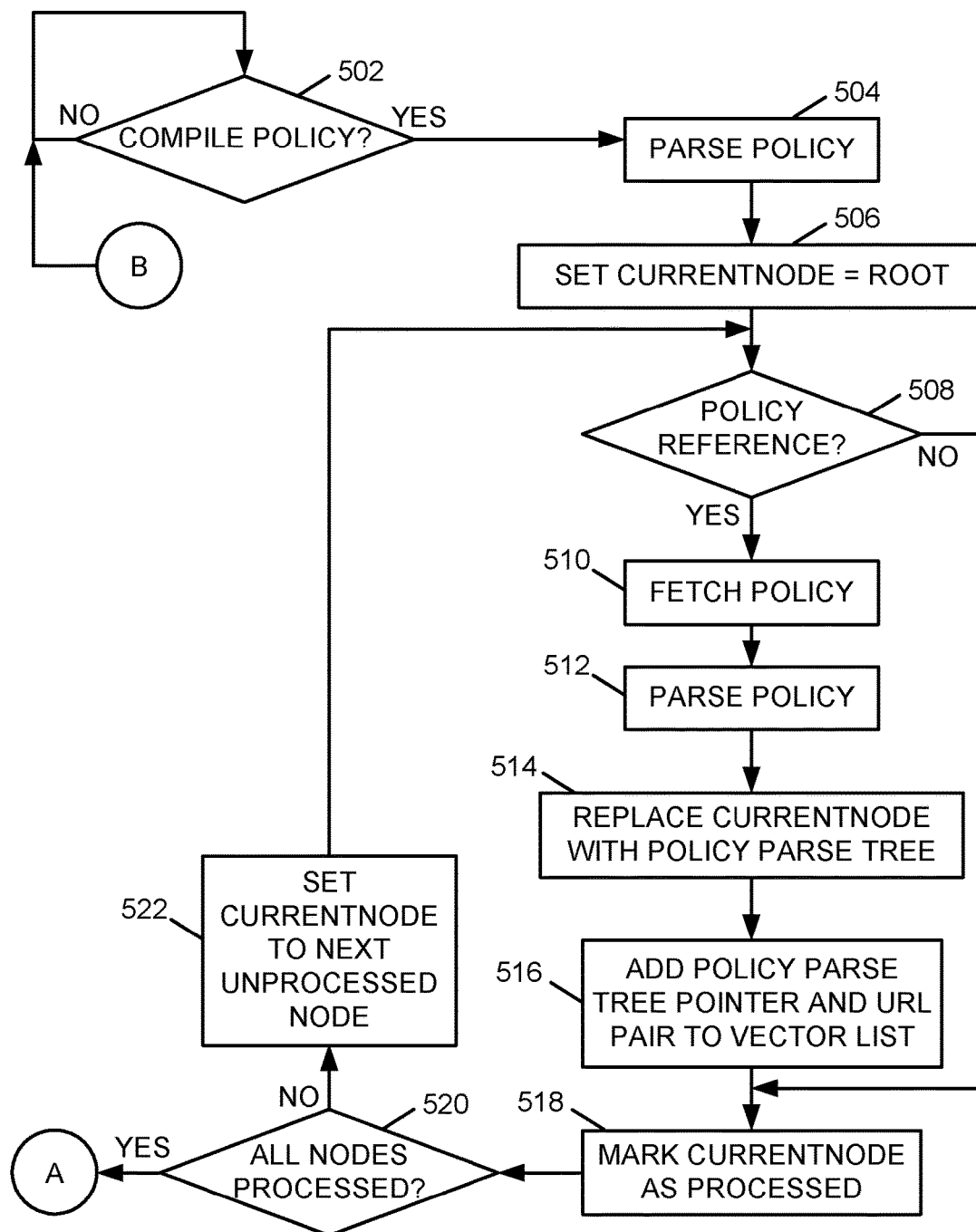
FIG. 5A is a flow chart of an example of an implementation of an initial portion of a process for policy compilation involving policy reference resolution and preprocessing for policy normalization to support instrumentation and monitoring of service level agreement (SLA) and service policy enforcement according to an embodiment of the present subject matter.
Figure 5B:
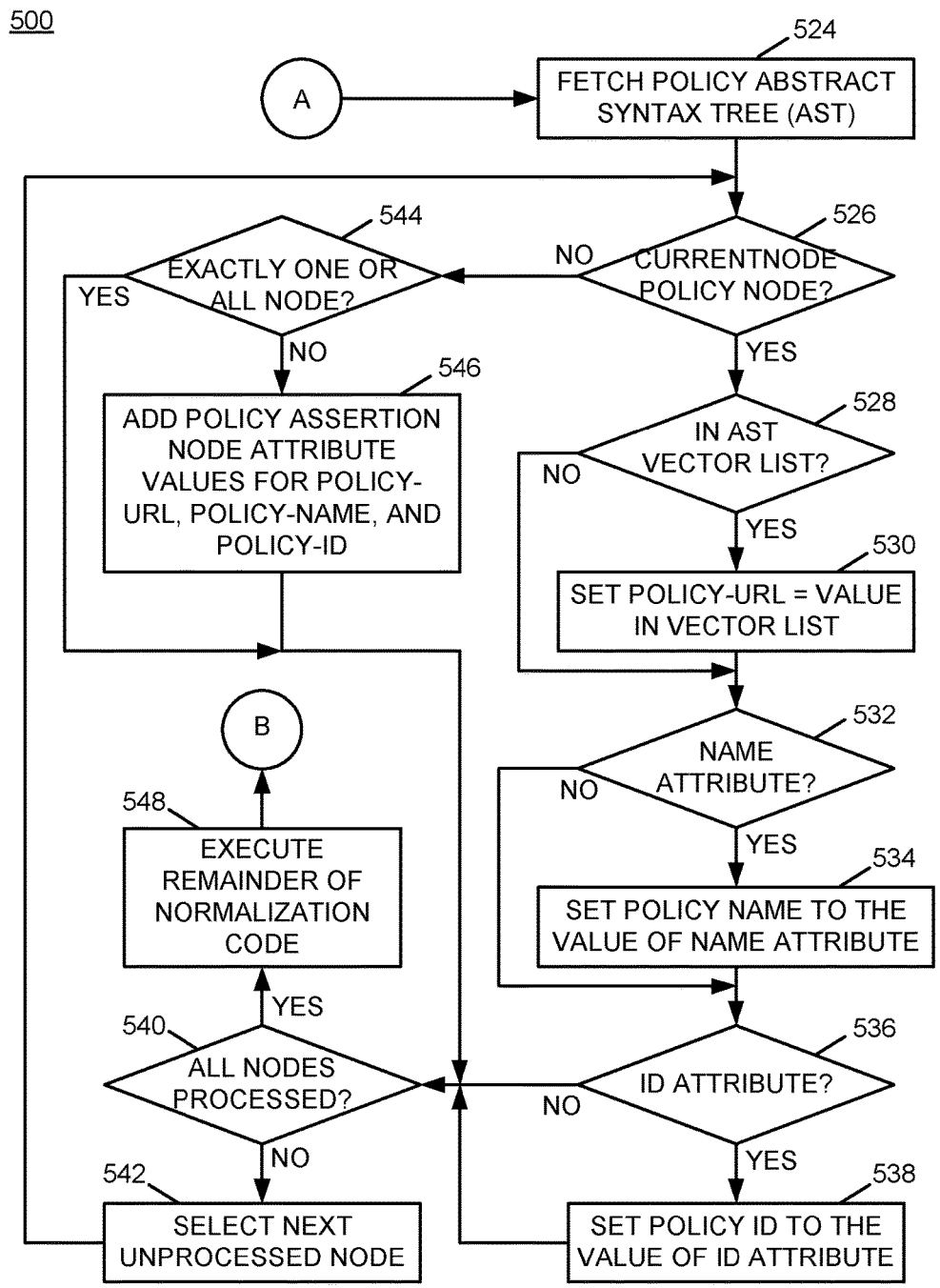
FIG. 5B is a flow chart of an example of an implementation of an additional portion of a process for policy compilation involving policy reference resolution and preprocessing for policy normalization to support instrumentation and monitoring of service level agreement (SLA) and service policy enforcement according to an embodiment of the present subject matter.

FIG. 4 through FIG. 5B described below represent example processes that may be executed by devices, such as the core processing module 200, to perform the instrumentation and monitoring of service level agreement (SLA) and service policy enforcement associated with the present subject matter. Many other variations on the example processes are possible and all are considered within the scope of the present subject matter. The example processes may be performed by modules, such as the policy framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for instrumentation and monitoring of service level agreement (SLA) and service policy enforcement. At block 402, the process 400 captures, via a processor, source policy identification information of a registry service policy that comprises a source policy identifier (ID), a source policy name, and a source policy uniform resource locator (URL). At block 404, the process 400 correlates the captured source policy identification information with configured policy enforcement processing rules and processing actions using a source policy reference key. At block 406, the process 400 captures per-transaction service policy enforcement information that documents policy enforcement activities performed by a policy enforcement point (PEP). At block 408, the process 400 correlates the captured per-transaction service policy enforcement information with the captured source policy identification information using the source policy reference key.

FIGS. 5A-5B illustrate a flow chart of an example of an implementation of process 500 for policy compilation involving policy reference resolution and preprocessing for policy normalization to support instrumentation and monitoring of service level agreement (SLA) and service policy enforcement. The process 500 may be performed, for example, by the policy mapping component 230 illustrated in FIG. 3. FIG. 5A illustrates initial processing within the process 500.

As described in more detail below, compilation of a policy involves fetching the policy and policy metadata with respect to web services and attached policies from the policy registry 114 or from a local WSDL. The process 500 processes the policy documents/metadata into abstract syntax trees (ASTs) that store the compiled policy documents. The compilation process further involves policy reference resolution. The policy reference resolution involves resolving external policy references of the fetched policy, creating a parse tree for the fetched policy, and embedding this tree in the AST of the referenced policy. Additionally, a vector list is created that includes a list of pairs containing a policy URL and a pointer to the sub-tree corresponding to the fetched policy.

At decision point 502, the process 500 makes a determination as to whether a request to compile a policy has been detected. The determination that request to compile a policy has been detected may be made, for example, in response to a policy deployment or policy update or any other event as appropriate for a given implementation. In response to determining that a request to compile a policy has been detected, the process 500 parses the policy at block 504. The process 500 sets a current node (currentnode) of the AST to "root" at block 506. At decision point 508, the process 500 makes a determination as to whether the current root node represents a policy reference.

In response to determining that the current root node represents a policy reference, the process 500 fetches the policy at block 510. At block 512, the process 500 parses the fetched policy. At block 514, the process 500 replaces the current node with a policy parse tree. At block 516, the process 500 adds a policy parse tree pointer and URL pair to the vector list.

In response to completion of adding the policy parse tree pointer and URL to the vector list at block 516, or in response to determining that the current root node does not represent a policy reference at decision point 508, the process 500 marks the current node as having been processed at block 518. At decision point 520, the process 500 makes a determination as to whether all nodes have been processed. In response to determining that all nodes have not been processed, the process 500 sets the current node to the next unprocessed node at block 522, and returns to decision point 508 and iterates as described above. In response to determining that all nodes have been processed at decision point 520, the process 500 transitions to the processing shown and described in association with FIG. 5B.

FIG. 5B illustrates additional processing associated with the process 500 for policy compilation involving policy reference resolution and preprocessing for policy normalization to support instrumentation and monitoring of service level agreement (SLA) and service policy enforcement. To perform the preprocessing for normalization, as described in more detail below, using the vector produced above in FIG. 5A, the process 500 recursively traverses the AST and adds the monitoring instrumentation described above. Several parameters (e.g., source-policy-id, source-policy-name, and source-policy-url) are added to the recursive calls and the processing of policy and assertion nodes is modified as follows. When a policy node is encountered during the normalization pre-processing tree traversal, a new value for the "source-policy-url" attribute is determined. The value of this attribute is obtained by first searching the AST's new vector list. If the pointer to this policy node is found in the vector list, the URL in that pair is used. If the pointer to this policy node is not found, the passed-in URL (e.g., the URL of an embedding policy) is used if not NULL. If there is no embedding policy, then the WSDL URL is used. The new value for the "source-policy-name" may also be determined. If a name is specified in the policy, that name becomes the value of the "source-policy-name" attribute. If a name is not specified, the passed-in name is used. Regarding the attribute "source-policy-id," the value may be obtained in a manner analogous to that of the "source-policy-name." The parameter values for these attributes may be passed down to the policy node's children as the tree is recursively traversed. When a policy assertion node is processed, the three attributes may be added to this node in the normalized AST with the passed-in values.

The process 500 fetches the abstract syntax tree (AST) of the policy at block 524. At decision point 526, the process 500 makes a determination as to whether a current node (currentnode) is a policy node. In response to determining that the current node is a policy node, the process 500 makes a determination at decision point 528 as to whether the policy is in the AST vector list. In response to determining that the policy is in the AST vector list, the process 500 sets the "policy-URL" variable to the value in the vector list at block 530.

In response to setting the "policy-URL" variable to the value in the vector list at block 530, or in response to determining that the policy is not in the AST vector list at decision point 528, the process 500 makes a determination at decision point 532 as to whether a "name" reference is an attribute of this policy node. In response to determining that a "name" reference is an attribute of this policy node, the process 500 sets the "policy-name" variable to the value of the "name" attribute at block 534.

In response to setting the "policy-name" variable to the value of the "name" attribute at block 534, or in response to determining that a "name" reference is not an attribute of this policy node at decision point 532, the process 500 makes a determination at decision point 536 as to whether an identifier "ID" reference is an attribute of the policy node. In response to determining that an identifier "ID" reference is an attribute of the policy node, the process 500 sets the "policy-identifier" variable to the value of the "ID" attribute at block 538.

In response to setting the "policy-identifier" variable to the value of the "ID" attribute at block 538, or in response to determining that an identifier "ID" reference is not an attribute of the policy node at decision point 536, the process 500 makes a determination at decision point 540 as to whether all nodes have been processed. In response to determining that all nodes have not been processed, the process 500 selects the next unprocessed node at block 542, and returns to decision point 526 and iterates as described above. The order in which the nodes are processed may be as specified by any of the recursive tree traversal algorithms and the values of variables "policy-URL," "policy-name," and "policy-identifier" reflect the values passed in as arguments to the recursive call.

Returning to the description of decision point 526, in response to determining that the current node (currentnode) is not a policy node, the process 500 make a determination as to whether the current node is an "Exactly One" node or an "All" node at decision point 544. In response to determining that the current node is either an "Exactly One" node or an "All" node, the process 500 returns to decision point 540 and iterates as described above. In response to determining that the current node is neither an "Exactly One" node nor an "All" node at decision point 544, the process 500 identifies the node as an assertion node at block 546, and adds assertion node attributes for the policy. The "source-policy-id" reference is set to the value of the original source "policy-identifier" variable passed into the recursive call, the "source-policy-name" reference is set to the value of the "policy-name" variable, and the "source-policy-url" reference is set to the value of the "policy-URL" variable. The process returns to decision point 540 and iterates as described above.

Returning to the description of decision point 540, in response to determining that all nodes have been processed, the process 500 executes the remainder of the normalization code at block 548. Execution of the normalization code may be performed for example based upon defined standards and is outside of the scope of the present subject matter. The process 500 returns to the processing described in association with FIG. 5A at decision point 502 and iterates as described above.

As such, the process 500 fetches and parses original source policies. The process 500 replaces policy references with policy parse trees, and produces a vector list of pairs of policy tree pointers and URLs. As such, the process 500 documents references to the original source policies for correlation with enforcement activities, as described above. The process 500 also performs preprocessing for normalization of a policy for enforcement and for instrumentation and monitoring of service level agreement (SLA) and service policy enforcement. The process 500 processes policy nodes and assertion nodes to capture metadata from the original source policy associated with the respective nodes. The process 500 executes the remainder of the normalization code usable for instrumentation and monitoring of service level agreement (SLA) and service policy enforcement in response to completion of the preprocessing, as described above.

As described above in association with FIG. 1 through FIG. 5B, the example systems and processes provide instrumentation and monitoring of service level agreement (SLA) and service policy enforcement. Many other variations and additional activities associated with instrumentation and monitoring of service level agreement (SLA) and service policy enforcement are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   capturing, from a policy registry via a processor within a runtime policy correlation data structure, source policy identification information of a registry service policy that comprises a source policy identifier (ID), a source policy name, and a source policy uniform resource locator (URL);
   correlating, within the runtime policy correlation data structure using a source policy reference key, the captured source policy identification information with configured runtime policy enforcement processing rules and processing actions established during policy binding at a policy enforcement point (PEP) that cause the PEP to enforce runtime provisions of the registry service policy;
   capturing per-transaction service policy enforcement information that documents which configured runtime policy enforcement activities are performed by the PEP on individual transactions;
   correlating, within a per-transaction service data table, the captured per-transaction service policy enforcement information with the captured source policy identification information using the source policy reference key;
   receiving a query from a policy monitoring point (PMP) for the correlated per-transaction service policy enforcement information of at least one transaction; and
   providing the correlated per-transaction service policy enforcement information of the at least one transaction from the per-transaction service data table in response to the query from the PMP.

2. The method of claim 1, where correlating, within the runtime policy correlation data structure using the source policy reference key, the captured source policy identification information with the configured runtime policy enforcement processing rules and processing actions comprises:
   compiling an abstract syntax tree (AST) representation of the registry service policy;
   recursively traversing the AST representation to identify policy assertions within the AST representation of the registry service policy while adding PEP monitoring instrumentation that facilitates the per-transaction capture of the service policy enforcement information; and
   mapping the identified policy assertions within the AST representation of the registry service policy to the captured source policy identification information within the runtime policy correlation data structure to facilitate the correlation of the captured per-transaction service policy enforcement information with the captured source policy identification information using the source policy reference key.

3. The method of claim 2, where mapping the identified policy assertions within the AST representation of the registry service policy to the captured source policy identification information within the runtime policy correlation data structure comprises:
   creating the configured runtime policy enforcement processing rules and processing actions from the AST representation of the registry service policy; and
   storing, during policy normalization to correlate the configured runtime policy enforcement processing rules and processing actions with the registry service policy, identifiers of the configured runtime policy enforcement processing rules and processing actions with the source policy identification information as an entry within the runtime policy correlation data structure, where the entry is indexed using the source policy reference key.

4. The method of claim 1, where capturing the per-transaction service policy enforcement information that documents which configured runtime policy enforcement activities are performed by the PEP on individual transactions comprises:
   on a per-transaction basis:
      capturing performed runtime policy enforcement processing rules and processing actions; and
      storing the source policy reference key and mediation enforcement metrics associated with the captured runtime policy enforcement processing rules and processing actions, where the mediation enforcement metrics comprise indications of the captured runtime policy enforcement processing rules and processing actions.

5. The method of claim 4, where storing the source policy reference key and the mediation enforcement metrics comprises storing the source policy reference key and the mediation enforcement metrics within the per-transaction service data table.

6. The method of claim 1, where correlating, within the per-transaction service data table, the captured per-transaction service policy enforcement information with the captured source policy identification information using the source policy reference key comprises adding an entry for each transaction within a policy enforcement data model.

7. A system, comprising:
   a memory; and
   a processor programmed to:
      capture, from a policy registry within a runtime policy correlation data structure stored in the memory, source policy identification information of a registry service policy that comprises a source policy identifier (ID), a source policy name, and a source policy uniform resource locator (URL);
      correlate, within the runtime policy correlation data structure using a source policy reference key, the captured source policy identification information with configured runtime policy enforcement processing rules and processing actions established during policy binding at a policy enforcement point (PEP) that cause the PEP to enforce runtime provisions of the registry service policy;

capture per-transaction service policy enforcement information that documents which configured runtime policy enforcement activities are performed by the PEP on individual transactions;

correlate, within a per-transaction service data table stored in the memory, the captured per-transaction service policy enforcement information with the captured source policy identification information within the memory using the source policy reference key;

receive a query from a policy monitoring point (PMP) for the correlated per-transaction service policy enforcement information of at least one transaction; and provide the correlated per-transaction service policy enforcement information of the at least one transaction from the per-transaction service data table in response to the query from the PMP.

8. The system of claim 7, where in being programmed to correlate within the runtime policy correlation data structure using the source policy reference key, the captured source policy identification information with the configured runtime policy enforcement processing rules and processing actions, the processor is programmed to:

compile an abstract syntax tree (AST) representation of the registry service policy;

recursively traverse the AST representation to identify policy assertions within the AST representation of the registry service policy while adding PEP monitoring instrumentation that facilitates the per-transaction capture of the service policy enforcement information; and map the identified policy assertions within the AST representation of the registry service policy to the captured source policy identification information within the runtime policy correlation data structure to facilitate the correlation of the captured per-transaction service policy enforcement information with the captured source policy identification information using the source policy reference key.

9. The system of claim 8, where in being programmed to map the identified policy assertions within the AST representation of the registry service policy to the captured source policy identification information within the shared runtime policy correlation data structure, the processor is programmed to:

create the configured runtime policy enforcement processing rules and processing actions from the AST representation of the registry service policy; and store, during policy normalization to correlate the configured runtime policy enforcement processing rules and processing actions with the registry service policy, identifiers of the configured runtime policy enforcement processing rules and processing actions with the source policy identification information as an entry within the runtime policy correlation data structure, where the entry is indexed using the source policy reference key.

10. The system of claim 7, where in being programmed to capture the per-transaction service policy enforcement information that documents which configured runtime policy enforcement activities are performed by the PEP on the individual transactions, the processor is programmed to:

on a per-transaction basis:

capture performed runtime policy enforcement processing rules and processing actions; and store the source policy reference key and mediation enforcement metrics associated with the captured runtime policy enforcement processing rules and processing actions within the per-transaction service data table, where the mediation enforcement metrics comprise indications of the captured runtime policy enforcement processing rules and processing actions.

11. The system of claim 7, where in being programmed to correlate within the per-transaction service data table, the captured per-transaction service policy enforcement information with the captured source policy identification information within the memory using the source policy reference key, the processor is programmed to add an entry for each transaction within a policy enforcement data model.

12. A computer program product, comprising:

a computer readable memory device having computer readable program code embodied therewith, where the computer readable program code when executed on a computer causes the computer to:

capture, from a policy registry within a runtime policy correlation data structure, source policy identification information of a registry service policy that comprises a source policy identifier (ID), a source policy name, and a source policy uniform resource locator (URL);

correlate, within the runtime policy correlation data structure using a source policy reference key, the captured source policy identification information with configured runtime policy enforcement processing rules and processing actions established during policy binding at a policy enforcement point (PEP) that cause the PEP to enforce runtime provisions of the registry service policy;

capture per-transaction service policy enforcement information that documents which configured runtime policy enforcement activities are performed by the PEP on individual transactions;

correlate, within a per-transaction service data table, the captured per-transaction service policy enforcement information with the captured source policy identification information using the source policy reference key;

receive a query from a policy monitoring point (PMP) for the correlated per-transaction service policy enforcement information of at least one transaction; and provide the correlated per-transaction service policy enforcement information of the at least one transaction from the per-transaction service data table in response to the query from the PMP.

13. The computer program product of claim 12, where in causing the computer to correlate, within the runtime policy correlation data structure using the source policy reference key, the captured source policy identification information with the configured runtime policy enforcement processing rules and processing actions, the computer readable program code when executed on the computer causes the computer to:

compile an abstract syntax tree (AST) representation of the registry service policy;

recursively traverse the AST representation to identify policy assertions within the AST representation of the registry service policy while adding PEP monitoring instrumentation that facilitates the per-transaction capture of the service policy enforcement information; and map the identified policy assertions within the AST representation of the registry service policy to the captured source policy identification information within the runtime policy correlation data structure to facilitate the correlation of the captured per-transaction service policy enforcement information with the captured source policy identification information using the source policy reference key.

14. The computer program product of claim 13, where in causing the computer to map the identified policy assertions within the AST representation of the registry service policy to the captured source policy identification information within the runtime policy correlation data structure, the computer readable program code when executed on the computer causes the computer to:

create the configured runtime policy enforcement processing rules and processing actions from the AST representation of the registry service policy; and store, during policy normalization to correlate the configured runtime policy enforcement processing rules and processing actions with the registry service policy, identifiers of the configured runtime policy enforcement processing rules and processing actions with the source policy identification information as an entry within the runtime policy correlation data structure, where the entry is indexed using the source policy reference key.

15. The computer program product of claim 12, where in causing the computer to capture the per-transaction service policy enforcement information that documents which configured runtime policy enforcement activities are performed by the PEP on the individual transactions, the computer readable program code when executed on the computer causes the computer to:

on a per-transaction basis:

capture performed runtime policy enforcement processing rules and processing actions; and store the source policy reference key and mediation enforcement metrics associated with the captured runtime policy enforcement processing rules and processing actions, where the mediation enforcement metrics comprise indications of the captured runtime policy enforcement processing rules and processing actions.

16. The computer program product of claim 15, where in causing the computer to store the source policy reference key and the mediation enforcement metrics, the computer readable program code when executed on the computer causes the computer to store the source policy reference key and the mediation enforcement metrics within the per-transaction service data table.

17. The computer program product of claim 12, where in causing the computer to correlate, within the per-transaction service data table, the captured per-transaction service policy enforcement information with the captured source policy identification information using the source policy reference key, the computer readable program code when executed on the computer causes the computer to add an entry for each transaction within a policy enforcement data model.

* * * * *